United States Patent
Hyde

(10) Patent No.: US 7,405,659 B1
(45) Date of Patent: Jul. 29, 2008

(54) RFID TAG SWITCHED CAPACITOR SLICER THRESHOLD

(75) Inventor: John D. Hyde, Corvalis, OR (US)

(73) Assignee: Impinj, Inc., Seattle, WA (US)

( * ) Notice: Subject to any disclaimer, the term of this patent is extended or adjusted under 35 U.S.C. 154(b) by 388 days.

(21) Appl. No.: 11/340,033

(22) Filed: Jan. 26, 2006

Related U.S. Application Data

(63) Continuation-in-part of application No. 10/815,474, filed on Mar. 31, 2004, now abandoned.

(60) Provisional application No. 60/699,761, filed on Jul. 14, 2005.

(51) Int. Cl.
G08B 13/14 (2006.01)

(52) U.S. Cl. ............... 340/572.4; 340/572.4; 340/10.4; 340/825.69

(58) Field of Classification Search .............. 340/10.4, 340/10.1, 10.2, 572.2, 572.4, 825.69, 825.72, 340/10.51, 572.1, 10.5, 10.34; 235/462, 235/436
See application file for complete search history.

(56) References Cited

U.S. PATENT DOCUMENTS

| | | | | |
|---|---|---|---|---|
| 4,720,856 | A * | 1/1988 | Pace et al. | 379/395.01 |
| 5,608,739 | A * | 3/1997 | Snodgrass et al. | 714/785 |
| 5,790,946 | A * | 8/1998 | Rotzoll | 455/343.1 |
| 6,266,362 | B1 * | 7/2001 | Tuttle et al. | 375/141 |
| 6,294,953 | B1 * | 9/2001 | Steeves | 329/341 |
| 6,639,459 | B1 * | 10/2003 | Devilbiss | 329/341 |
| 6,784,789 | B2 * | 8/2004 | Eroglu et al. | 340/10.6 |
| 6,834,591 | B2 * | 12/2004 | Rawcliffe et al. | 102/214 |

OTHER PUBLICATIONS

A) EPCglobal, Inc. "Specification for RFID Air Interface-EPC Radio-Frequency Identity Protocols Class-1 Generation-2 UHF RFID Protocol for Communications [continued below] [continued] at 860 MHz-960 MHz, Version 1.1.0" (a.k.a. "The Gen 2 Spec".) EPCglobal Inc., Dec. 17, 2005. <http://www.epcglobalinc.org>.
(B) EPCglobal Inc. "Specification for RFID Air Interface-EPC Radio-Frequency Identity Protocols Class-1 Generation-2 UHF RFID Protocol for Communications [continued below] [continued] at 860 MHz-960 MHz, Version 1.0.8." EPCglobal Inc., Dec. 14, 2004. <http://www.epcglobalinc.org>.
(C) Declaration of Stacy L. Jones authenticating attached Website Materials as accessed and posted at http://www.autoid.org/SC31/sc_31_wg4_sg3.htm on Sep. 1, 2006.

* cited by examiner

*Primary Examiner*—George A Bugg
*Assistant Examiner*—Daniel Previl
(74) *Attorney, Agent, or Firm*—Carl K. Turk

(57) ABSTRACT

An RFID tag that receives an RF signal from a reader is arranged to derive a threshold signal from a detected envelope of the RF signal, where the threshold signal is proportional to the detected envelope signal. The detected envelope signal is then compared to the threshold signal to derive a digital signal from the received RF signal. By maintaining the threshold signal proportional to the detected envelope signal, false bit detections due to ripple effect on the received signal and interference from other sources are reduced. The threshold signal may be derived employing a switched capacitor attenuator circuit.

25 Claims, 14 Drawing Sheets

*DEMODULATOR BLOCK DIAGRAM*

RFID TAG

*RFID TAG BLOCK DIAGRAM*

SIGNAL PATH DURING R => T

SIGNAL PATH DURING T => R

METHODS

RFID TAG SWITCHED CAPACITOR SLICER THRESHOLD

RELATED APPLICATIONS

This utility patent application is a continuation-in-part (CIP) of U.S. patent application Ser. No. 10/815,474, filed Mar. 31, 2004 now abandoned. The benefit of the earlier filing date of the parent application is hereby claimed under 35 U.S.C. §120.

This application also claims the benefit of U.S. Provisional Application Ser. No. 60/699,761 filed on Jul. 14, 2005, which is hereby claimed under 35 U.S.C. § 119(e). The parent application and the provisional application are incorporated herein by reference.

TECHNICAL FIELD

The present invention relates to Radio Frequency IDentification (RFID) systems; and more particularly, to a demodulator circuit for RFID tags that derives a threshold signal proportional to an input signal for analog-to-digital conversion.

BACKGROUND

Radio Frequency IDentification (RFID) systems typically include RFID tags and RFID readers (the former are also known as labels or inlays, and the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted-back RF wave either originally, or by reflecting back a portion of the interrogating RF wave, in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included a power storage device, such as a battery. RFID tags with a power storage device are known as active tags. Advances in semiconductor technology have miniaturized the electronics so much that an RFID tag can be powered solely by the RF signal it receives. Such RFID tags do not include a power storage device, and are called passive tags.

Digital information encoded onto the received RF signal is typically decoded in an RFID tag by detecting an envelope of the received RF signal and comparing the detected envelope to another analog signal. Usually, the received RF signal is at a baseline value. The information is encoded in a simple form by causing the RF signal to have a low value at predetermined periods corresponding to digital bit periods. Interference from other intentional and unintentional transmitters in the vicinity and ripple effect on the baseline may result in false bits being detected by the RFID tag.

SUMMARY

The invention provides RFID tag circuits and methods that derive a threshold signal to be compared to a detected envelope of the received RF signal. According to some embodiments, the threshold signal is derived from the detected envelope such that it is proportional to the detected envelope. As a result, false bit detections due to ripple effect on the received signal are reduced significantly. Moreover, because in many cases the interference may also be proportional to the detected envelope signal, false bit detections due to interference are also reduced significantly.

This and other features and advantages of the invention will be understood from the Detailed Description and the Drawings, in which:

BRIEF DESCRIPTION OF THE DRAWINGS

Non-limiting and non-exhaustive embodiments are described with reference to the following drawings.

DETAILED DESCRIPTION

Figure 1:
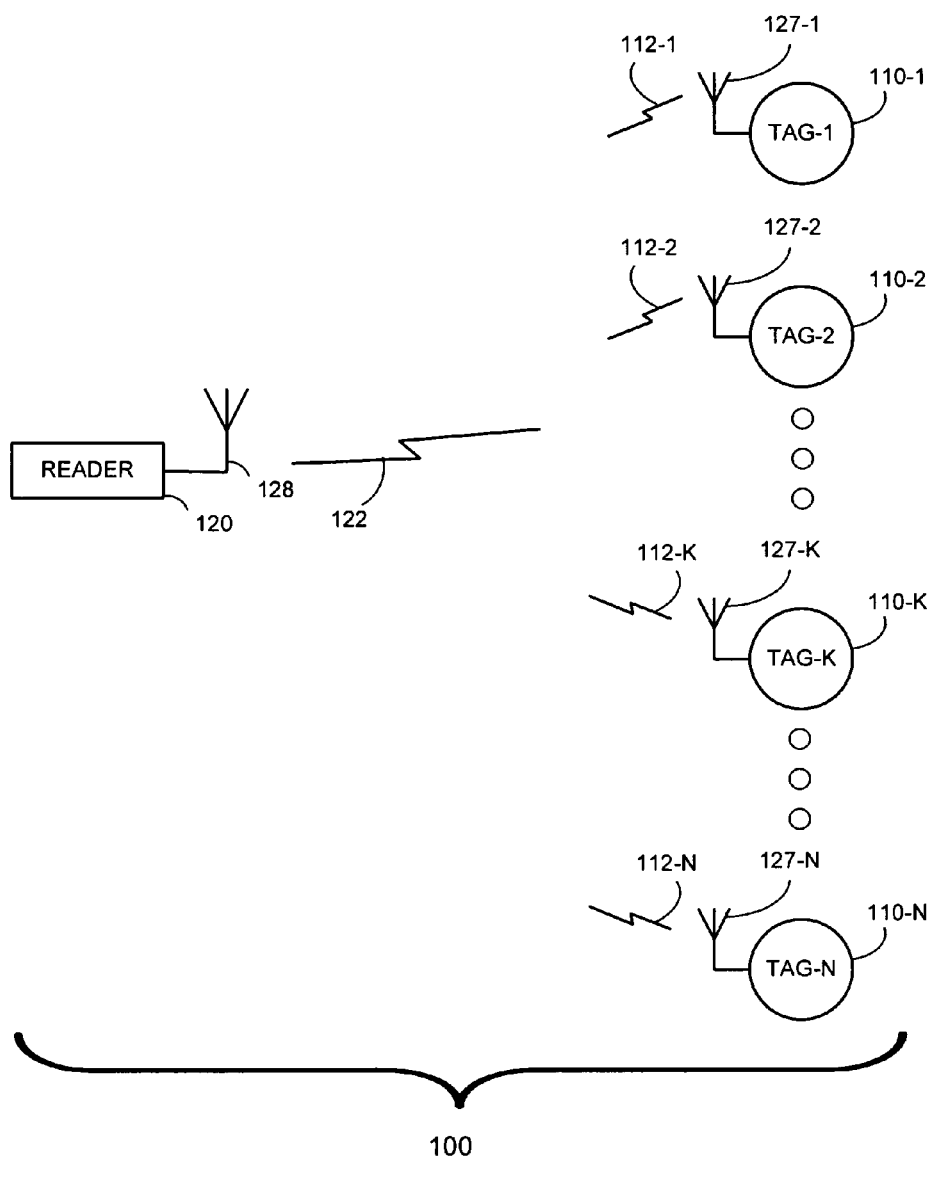
FIG. 1 is a diagram of an example RFID system including multiple RFID readers communicating with a plurality of RFID tags in their field of view.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

Briefly, this disclosure is about deriving a threshold signal from a detected envelope signal in RFID tags to compare to the detected envelope and derive a digital signal as a result of the comparison. The threshold signal may be derived employing a switched capacitor attenuator such that it is proportional to the detected envelope.

The invention is now described in more detail.

FIG. 1 is a diagram of an example RFID system 100 incorporating aspects of the invention. RFID system 100 includes an RFID reader and N RFID tags 110-1, 110-2, . . . , 110-K, . . . , 110-N in the vicinity of each other and of reader 120, which communicates with the tags in its field of view.

RFID reader 120 has an antenna 128, and may be in communication with database 132. Reader 120 transmits an interrogating Radio Frequency (RF) wave 122, which can be perceived by tags 110-1, 110-2, . . . , 110-K, . . . , 110-N.

RFID tags 110-X (X here stands for 1, 2, . . . , K, . . . , N) can be passive tags or active tags, i.e. tags having their own power source. Where tags 110-X are passive tags, they are powered from wave 122.

Each tag 110-X includes an antenna 127-X. Upon sensing interrogating RF wave 122, each tag 110-X may generate a wave 112-X in response. RFID reader 120 senses and interprets waves 112-X.

In FIG. 1, as in other figures, interrogating RF wave 122 is shown as larger than waves 112-X. This is to signify that interrogating RF wave 122 typically has a higher intensity than response wave 112-X.

Reader 120 and tag 110-X thus exchange data via waves 122 and 112-X. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a preamble, a null symbol, a symbol 0, a symbol 1, and so on. Further symbols can be implemented for ultimately exchanging binary data, such as "0" and "1", if that is desired.

In addition, groups of these bits and/or symbols are named according to their function. For example, it is customary to refer to such groups as "commands", "data", "payload", "handle", and so on.

Figure 2:
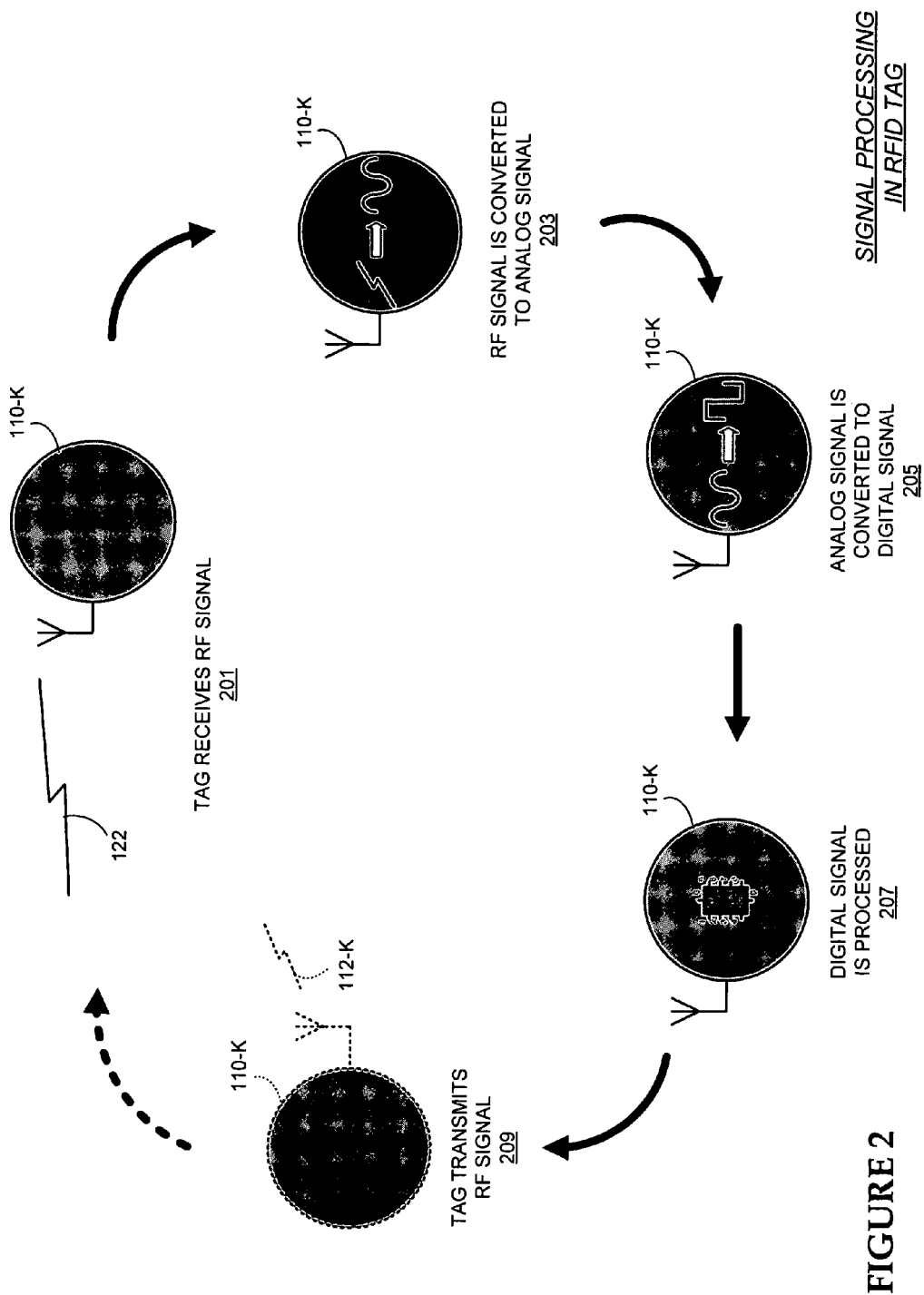
FIG. 2 is a conceptual diagram for explaining how an RFID tag operates in response to receiving an RF signal.

FIG. 2 is a conceptual diagram for explaining how an RFID tag operates in response to receiving an RF signal. In state 201, tag 110-K receives RF signal 122 from an RFID reader. RFID tags, especially passive tags, are typically in a power-off state when no RF signal is received. Once RF signal 122 is receive tag 110-K transitions to a power-on state.

In state 203, which is one of the power-on states, the RF signal is converted to an analog signal. This may be accomplished by detecting an envelope of the RF signal.

Next is state 205, where the analog signal is converted to a digital signal. The analog signal may be converted to the digital signal employing a number of methods. Commonly, the detected envelope signal is compared to another signal in the tag and high and low bit values of the digital signal are derived from the comparison.

State 207 follows state 205. The digital signal is processed in state 207. The processing of the digital signal may include filtering of the digital signal, decoding one or more commands, data packets, and other information from the digital signal, performing actions associated with the decoded information such as modifying a tag memory content, and the like.

State 207 may be followed by optional state 209, where tag 110-K transmits a response to the RFID reader in form of signal 112-K. In case of passive tags, the response may be transmitted as backscattering. After optional state 209, the tag may transition to the power-off state until another RF signal is received from the RFID reader.

Figure 3:
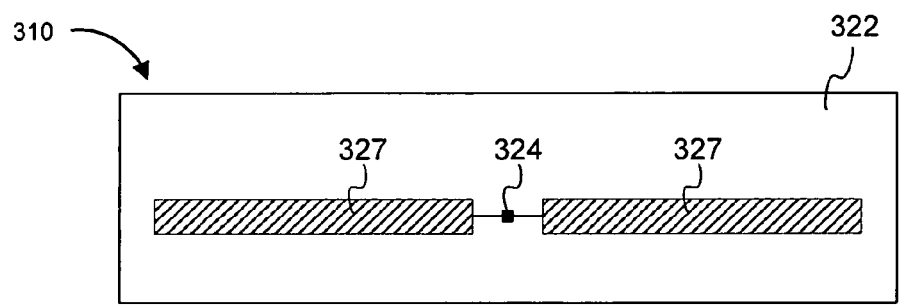
FIG. 3 is a diagram of an RFID tag such as one of the tags of FIG. 1.

FIG. 3 is a diagram of an RFID tag 320. Tag 320 is implemented as a passive tag, meaning it does not have its own power source. Much of what is described in this document, however, applies also to active tags.

Tag 320 is formed on a substantially planar inlay 322, which can be made in many ways known in the art. Tag 320 also includes two antenna segments 327, which are usually flat and attached to inlay 322. Antenna segments 327 are shown here forming a dipole, but many other embodiments using any number of antenna segments are possible.

Tag 320 also includes an electrical circuit, which is preferably implemented in an integrated circuit (IC) 324. IC 324 is also arranged on inlay 322, and electrically coupled to antenna segments 327. Only one method of coupling is shown, while many are possible.

In operation, a signal is received by antenna segments 327, and communicated to IC 324. IC 324 both harvests power, and decides how to reply, if at all. If it has decided to reply, IC 324 modulates the reflectance of antenna segments 327, which generates the backscatter from a wave transmitted by the reader. Coupling together and uncoupling antenna segments 327 can modulate the reflectance, as can a variety of other means.

In the embodiment of FIG. 3, antenna segments 327 are separate from IC 324. In other embodiments, antenna segments may alternately be formed on IC 324, and so on.

Figure 4:
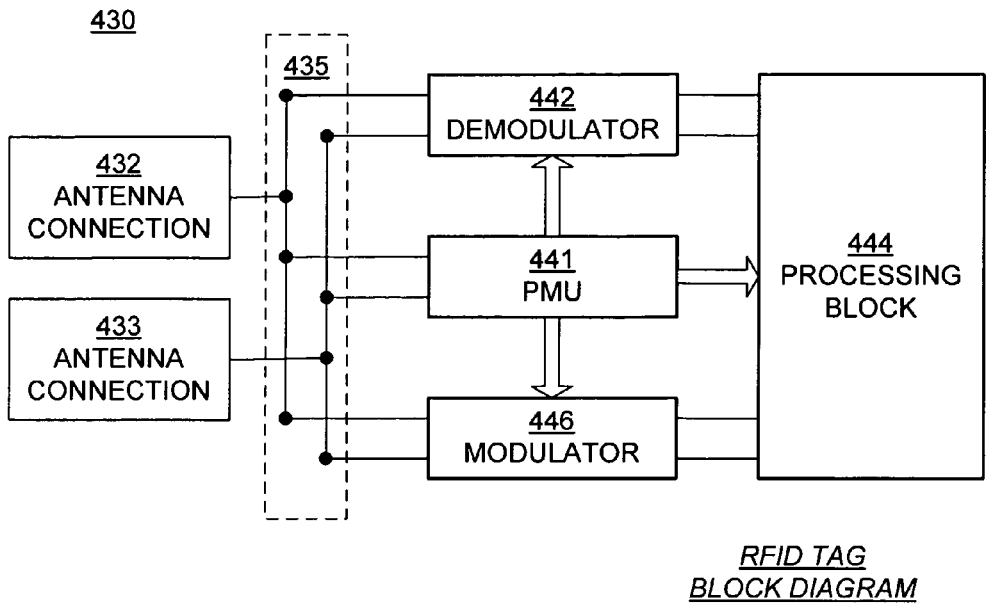
FIG. 4 is a block diagram illustrating one embodiment of an electrical circuit that may be employed in an RFID tag such as the RFID tag of FIG. 1.

FIG. 4 is a block diagram of an electrical circuit 430. Circuit 430 may be formed in an IC of an RFID tag, such as IC 324 of FIG. 3. Circuit 430 has a number of main components that are described in this document. Circuit 430 may have a number of additional components from what is shown and described, or different components, depending on the exact implementation.

Circuit 430 includes at least two antenna connections 432, 433, which are suitable for coupling to one or more antenna segments (not shown in FIG. 4). Antenna connections 432, 433 may be made in any suitable way, such as pads and so on. In a number of embodiments more antenna connections are used, especially in embodiments where more antenna segments are used.

Circuit 430 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 430 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 430. This is true for either or both of R→T sessions (when the received RF wave carries a signal) and T→R sessions (when the received RF wave carries no signal).

Circuit 430 additionally includes a demodulator 442. Demodulator 442 demodulates an RF signal received via antenna connections 432, 433. Demodulator 442 may be implemented in any way known in the art, for example including an attenuator stage, amplifier stage, and so on.

Circuit 430 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, a memory, a decoder, an encoder, and so on.

Circuit 430 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter.

It will be recognized at this juncture that circuit 430 can also be the circuit of an RFID reader according to the invention, without needing PMU 441. Indeed, an RFID reader can typically be powered differently, such as from a wall outlet, a battery, and so on. Additionally, when circuit 430 is configured as a reader, processing block 444 may have additional Inputs/Outputs (I/O) to a terminal, network, or other such devices or connections.

In terms of processing a signal, circuit 430 operates differently during a R→T session and a T→R session. The treatment of a signal is described below.

Figure 5A:
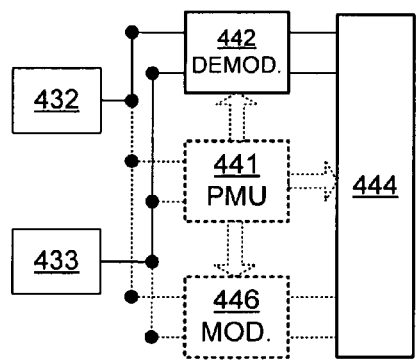
FIGS. 5A and 5B illustrate two versions of the electrical circuit of FIG. 4 emphasizing signal flow in receive and transmit operational modes of the RFID tag, respectively.

FIG. 5A shows version 530-A of circuit 430 of FIG. 4. Version 530-A shows the components of circuit 430 for a tag, further modified to emphasize a signal operation during a R→T session (receive mode of operation). An RF wave is received from antenna connections 432, 433, a signal is demodulated from demodulator 442, and then input to processing block 444 as S(R→T). In one embodiment according to the present invention, S(R→T) may include a received stream of symbols. It is during this operation that the tag may receive the instructions as to what backscatter period to use.

Version 530-A shows as relatively obscured those components that do not play a part in processing a signal during a R→T session. Indeed, PMU 441 may be active, and may be converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways. For example, it could be adjusting its own parameters for operation in a future session.

Figure 5B:
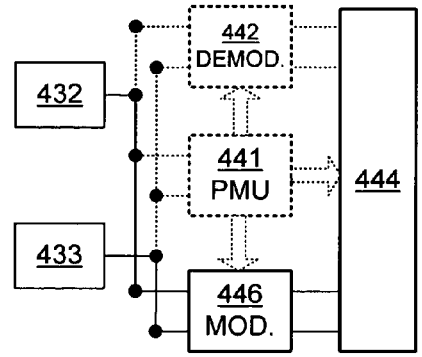

FIG. 5B shows version 530-B of circuit 430 of FIG. 4. Version 530-B shows the components of circuit 430 for a tag, further modified to emphasize a signal operation during a T→R session. A signal is output from processing block 444 as S(T→R). In one embodiment according to the present invention, S(T→R) may include a transmission stream of symbols. S(T→R) is then modulated by modulator 446, and output as an RF wave via antenna connections 432, 433.

Version 530-B shows as relatively obscured those components that do not play a part in processing a signal during a T→R session. Indeed, PMU 441 may be active, and may be converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways. For example, it could be adjusting its own parameters for operation in a future session.

Figure 6:
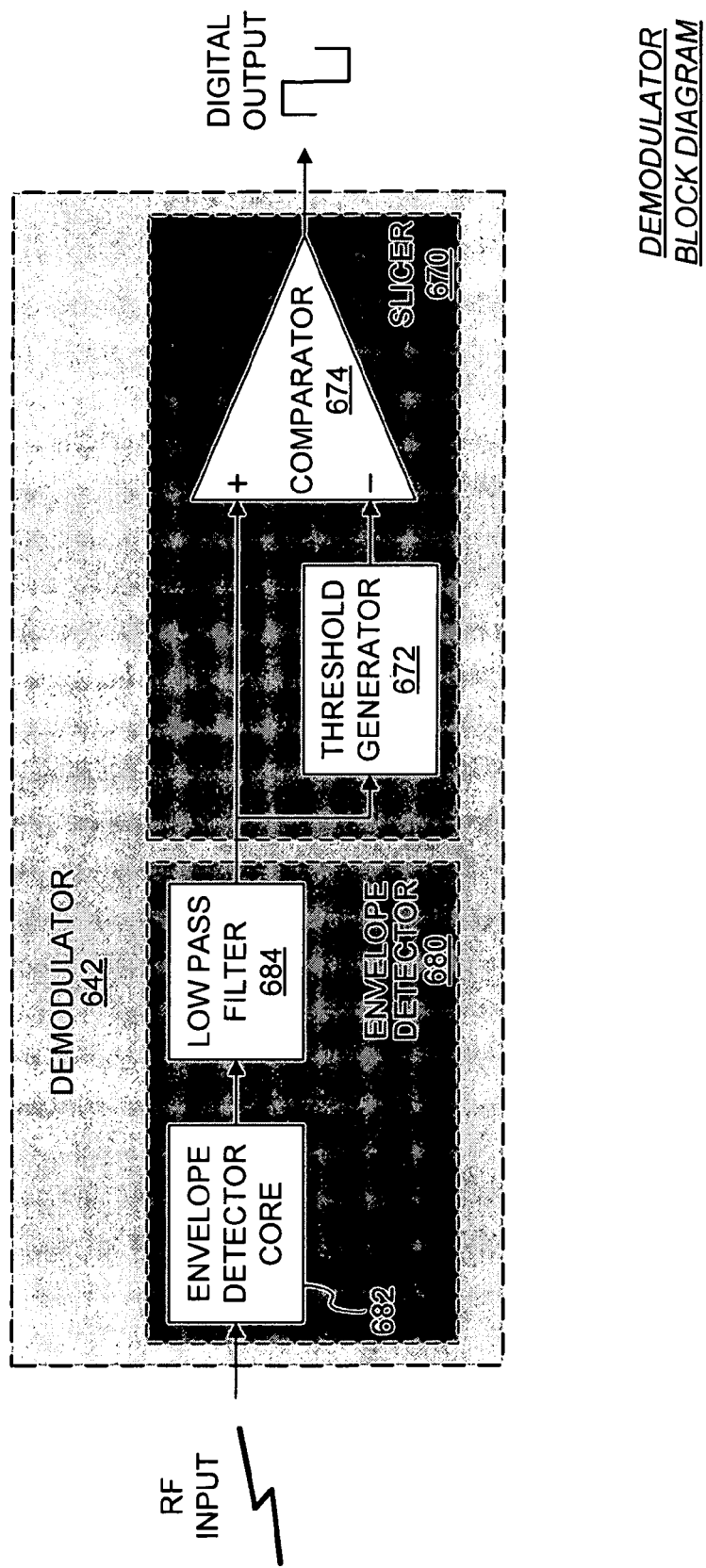
FIG. 6 is a diagram of major functional blocks of a demodulator circuit, such as the demodulator circuit of the RFID tag of FIG. 4.

FIG. 6 is a diagram of major functional blocks of a demodulator circuit, such as the demodulator circuit of the RFID tag of FIG. 4. Demodulator 642 is arranged to receive the RF signal from the RFID reader and convert it to a digital output signal that can be used by other circuitry within the RFID tag to decode commands, data, and the like, perform actions associated with the decoded commands, and respond to the reader. Demodulator 642 includes envelope detector 680 followed by slicer 670. Envelope detector 680 is configured to convert modulated RF input to an analog baseband signal. Envelope detector 680 includes envelope detector core 682 and low pass filter 684. Envelope detector core 682 may include a diode detector in its simplest form, but is not limited to a diode detector. The circuit is arranged to detect an envelope of the RF input signal and generate a low frequency (baseband) signal based on the envelope. Low pass filter 684 is arranged to attenuate high frequency components of the baseband signal that may cause problems in subsequent circuitry.

Slicer 670 is arranged to employ comparator 674 and threshold generator 672 to convert the analog baseband signal to the digital output signal. Threshold generator 672 is a key element of demodulator 642, and thus slicer 670. Typically, threshold generator 672 provides a constant amplitude signal such as a DC (direct current) signal to comparator 674. Another input of comparator 674 is arranged to receive the analog baseband signal. Comparator 674 then provides digital logic levels based on a result of the comparison between the analog baseband signal and the threshold signal provided by threshold generator 672. Accordingly, the slicer threshold is the reference voltage for comparator decisions.

An amplitude of the RF input signal, and along with that, the analog baseband signal amplitude may vary widely due to variations in reader distance, reader output power, multipath interference, and the like.

Furthermore, interference signals from intentional sources such as other readers in the vicinity and unintentional sources such as electronic equipment in the area may cause false bit detections in comparator 674. Accordingly, it is desirable for a slicer threshold to be compatible with the wide variation in input signal amplitude. A constant threshold lacks the flexibility, and may make the RFID tag prone to large errors in analog-to-digital conversion.

As will be evident to a person skilled in the art, the demodulator circuit of FIG. 6 may be modified if the data of the interrogating RF wave is encoded differently. For example, for Manchester encoded data, the DC average is guaranteed to be 50%. Accordingly, instead of employing a peak detector threshold generator, an average value threshold generator may be used instead. Other components of demodulator 642 may also be replaced with other circuits or their order changed without departing from a scope and spirit of the invention.

FIGS. 7A-7D are schematic block diagrams of various implementations of a slicer, such as the slicer of FIG. 6. In any of these slicer implementations the inverting and non-inverting comparator inputs may be reversed without significantly affecting demodulator operation, except for a logical inversion of the digital output.

Figure 7A:
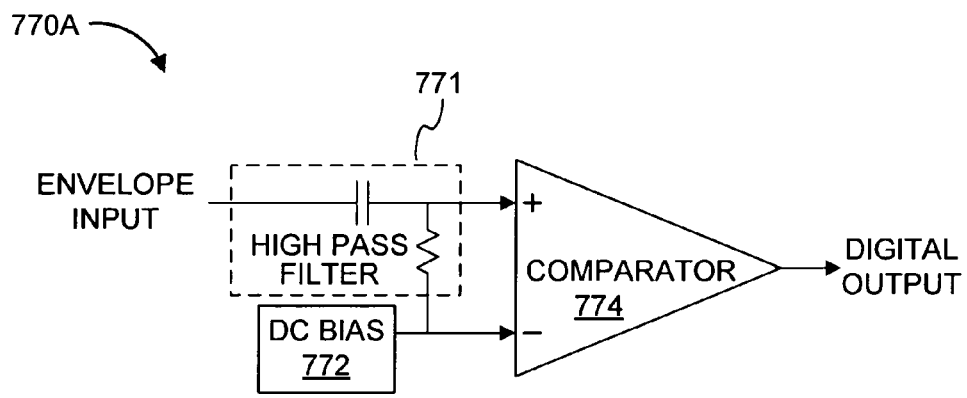
FIGS. 7A-7D are schematic block diagrams of various implementations of a slicer, such as the slicer of FIG. 6.

Referring to FIG. 7A, example slicer 770A includes high pass filter 771, DC bias generator 772, and comparator 774. The baseband analog signal based on the envelope of the RF input signal is provided to high pass filter 771, which may include a series-coupled capacitor circuit and resistor circuit in its simplest form. A non-inverting input of comparator 774 is provided a threshold signal from DC bias generator 772. As shown in the schematic diagram there is no relation between the input signal and the threshold signal. In fact, slicer threshold signal can be any convenient DC voltage, even ground in some cases.

High pass filter 771 provides AC coupling to the analog baseband signal. A pole of the high pass filter may be significantly smaller than a bandwidth of the signal. In typical applications, a duty cycle of data encoding may have to be close to 50%.

Figure 7B:
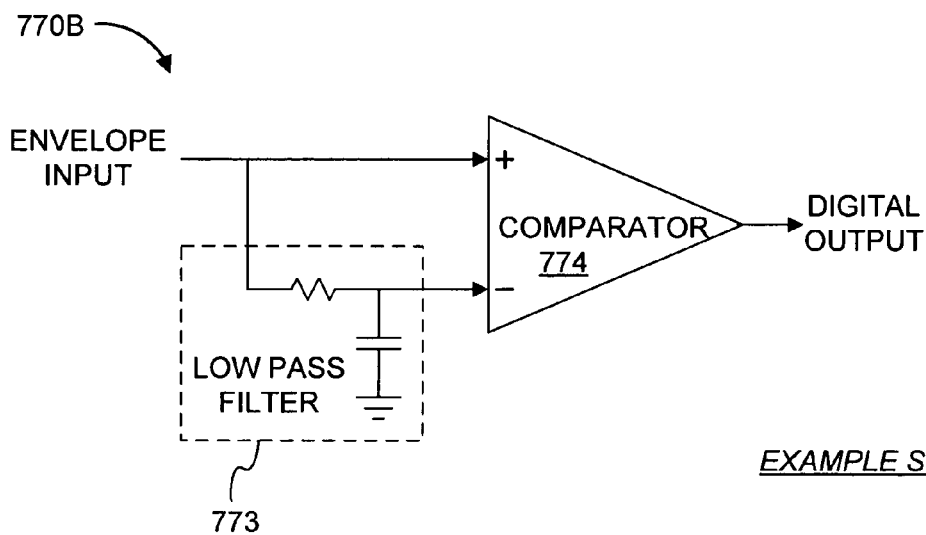

Now referring to FIG. 7B, example slicer 770B includes low pass filter 773 and comparator 774. The baseband analog signal is provided directly to a non-inverting input of comparator 774. The baseband analog signal is also provided to an inverting input of comparator 774 through low pass filter 773. The low pass filter 773 may include a series-coupled resistor circuit and capacitor circuit in its simplest form. The threshold signal is substantially DC with a relatively small signal component. A pole of the low pass filter is generally small compared to the input bandwidth. In typical applications, an average duty cycle of data encoding may have to be close to 50%.

Figure 7C:
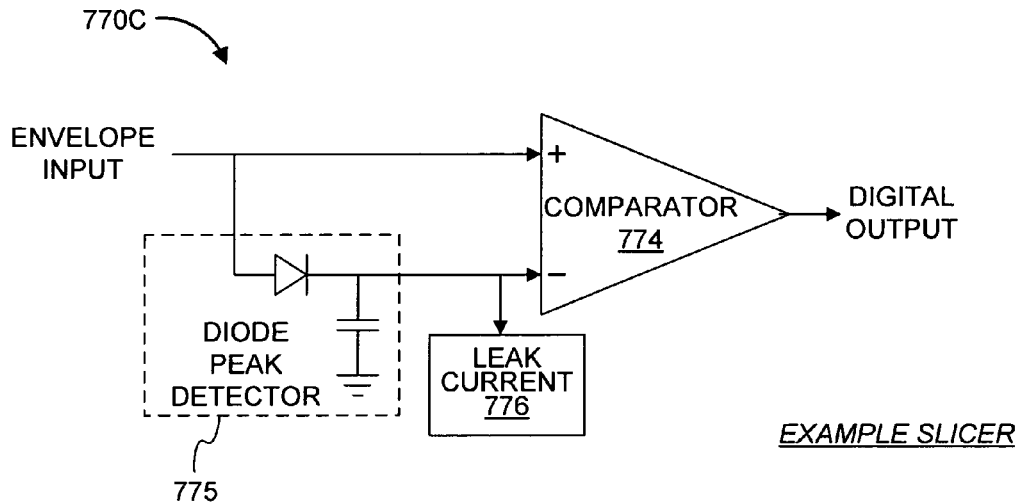

FIG. 7C illustrates another example slicer 770C that includes diode peak detector 775, leak current 776, and comparator 774. The baseband analog signal is again provided directly to a non-inverting input of comparator 774. Diode peak detector 775 provide a detected peak signal for the threshold such that the threshold signal is substantially equal to a difference between the envelope peak and a diode forward voltage. The diode may be a Schottky diode or a low threshold voltage MOS type device. Leak current 776 provides low droop rate to track signal fading. In typical applications, there are substantially no restrictions on the average duty cycle of data encoding for this type of slicer.

Figure 7D:
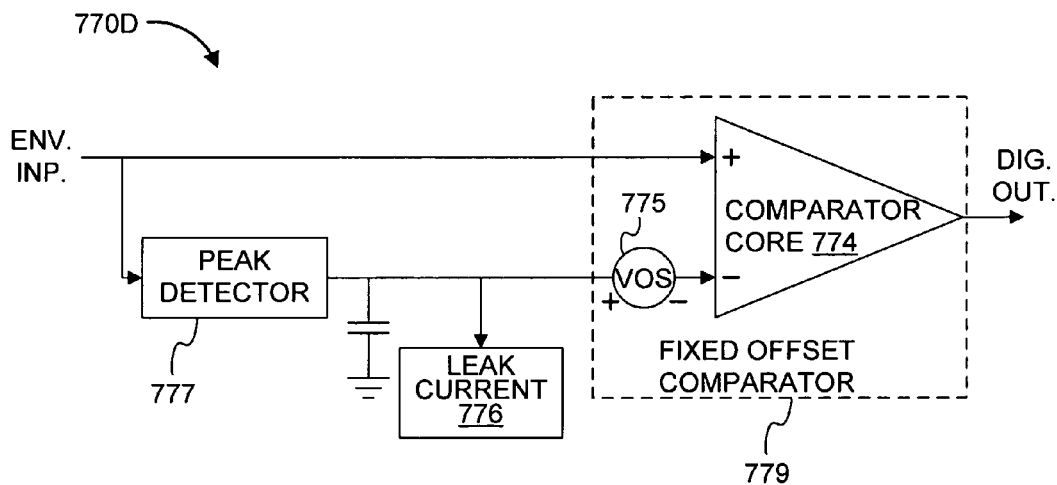

FIG. 7D illustrates a further example slicer 770D that includes peak detector 777, leak current 776, a filtering capacitor, and fixed offset comparator 779, which includes a fixed offset 775 and comparator 774. The baseband analog signal is still provided directly to a non-inverting input of comparator 774. Slicer threshold for slicer 770D is referenced to a peak of the envelope input. Peak detector 777 provides a detected peak signal, which is level shifted by the fixed offset 775 such that the threshold signal is substantially equal to a difference between the envelope peak and a comparator fixed offset. The comparator fixed offset may be implemented using a mismatched differential transistor pair, or a level shifter stage ahead of the comparator, or other means. Leak current 776 provides low droop rate to track signal fading. In typical applications, there are substantially no restrictions on the average duty cycle of data encoding for this type of slicer.

Figure 8:
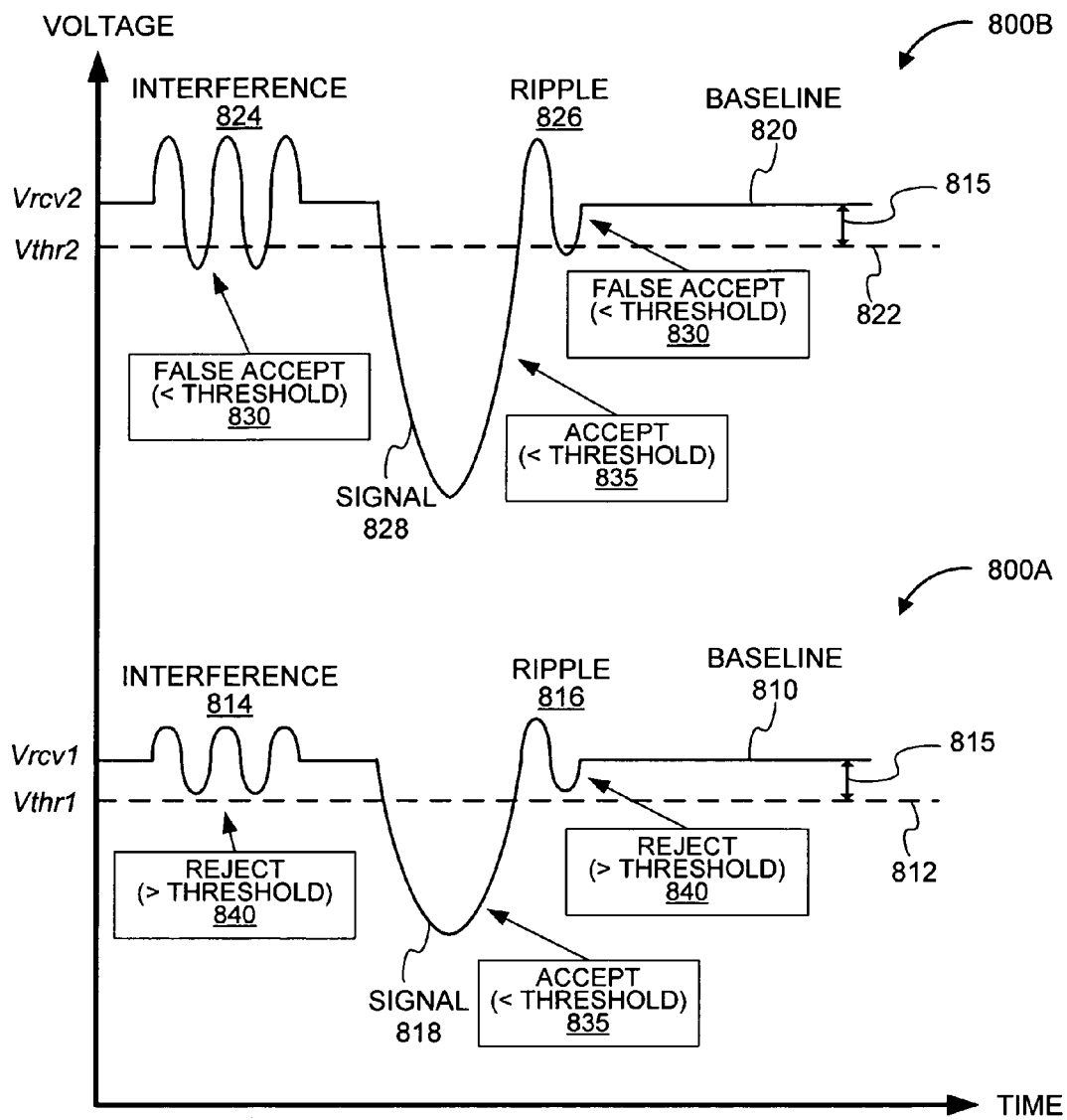
FIG. 8 is a diagram of example received waves and their acceptance or rejection in a fixed threshold system.

FIG. 8 is a diagram of example received waves and their acceptance or rejection in a fixed threshold system. The diagram of example received waves includes two parts.

The first part of the diagram indicated by reference numeral 800A shows a typical received wave comprising baseline 810 and signal 818. Baseline 810 at voltage value Vrcv1 is commonly used by the power management circuitry of the RFID tag to generate power for RFID tag circuits. Signal 818 is encoded onto baseline 810 to specify bit transitions to the tag. A number of repeated signals can be translated into bit values in a digital signal derived from the received wave by the demodulator of the tag.

In a representative operation, the received wave is compared to a threshold (e.g. threshold 812 at Vthr1) by a comparator. Depending on how the comparator is configured, it detects a bit transition any time the received wave drops below threshold 812 (e.g. high bit value or low bit value). A difference between Vrcv1 and Vthr1 is indicated by reference numeral 815.

In addition to signal 818, baseline 810 may also be encoded with unintended signals such as interference 814 or ripple 816. Interference 814 is caused by noise transmitted from intentional or unintentional transmitters in the vicinity if the tag. Transmission from another reader communicating with other tags is an example of intentional transmitter interference. Radiated noise from nearby electronic devices, inductive motors, and the like, can cause unintentional transmitter interference.

Ripple 816 is commonly caused by reactive characteristics of individual components in the RFID tag circuitry before the demodulator. Ripple may also be caused by data filtering in the RFID reader. Ripple 816 is commonly proportional to signal 818.

Three comparator decision scenarios are illustrated in the first part of the diagram (800A). The first scenario is rejection 840, where the interference on baseline 810 is still above threshold 812. In the second scenario, signal 818 is accepted (835) because it drops below threshold 812. The third scenario is rejection 840 for ripple 816, where the comparator correctly rejects the ripple due to its amplitude being above threshold 812.

The second part of the diagram indicated by reference numeral 800B shows a similar received wave, where along with the signal, amplitudes of the interference and the ripple are also larger compared to the received wave in the first part (800A). The increases in waveform amplitude may be due to variations in reader distance, reader output power, multipath interference, and the like.

Baseline 820 has a voltage value of Vrcv2. Threshold 822 has voltage value Vthr2. Because the threshold is fixed, a difference 815 between Vrcv2 and Vthr2 is the same as the difference between Vrcv1 and Vthr1.

A decision by the comparator for signal 828 is still acceptance 835. However, the increased amplitudes of interference 824 and ripple 826 drop below threshold 822 resulting in false acceptance 830 in both cases.

It should be noted that, while the amplitudes of interference 824 and ripple 826 are shown as increased in the second part of the diagram (800B), the interference and the ripple are generally independent from each other and do not have to change in proportional amounts.

Figure 9:
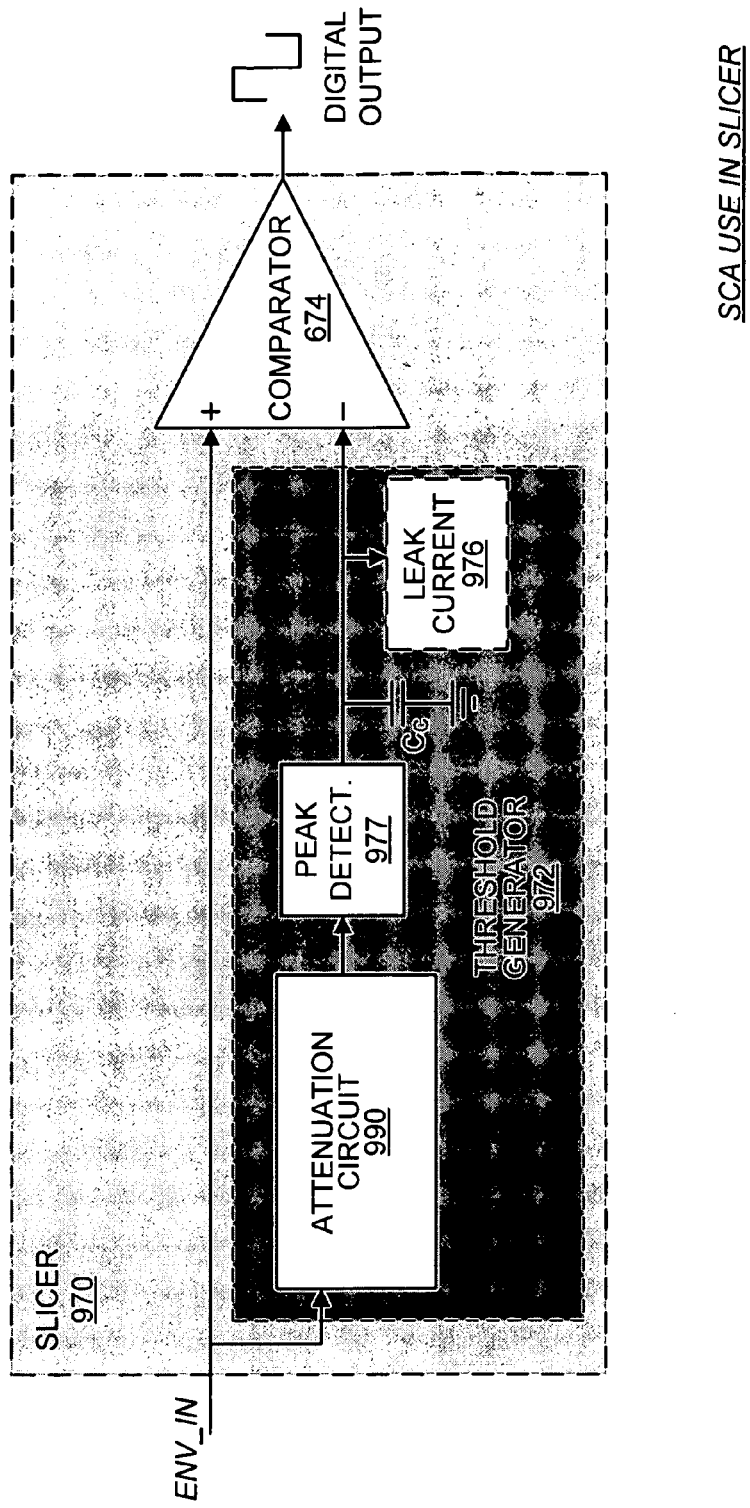
FIG. 9 is a block diagram of a slicer according to embodiments.

FIG. 9 is a block diagram of a slicer according embodiments. Slicer 970 includes threshold generator 972 with attenuation circuit 990, peak detector 977, filtering capacitor Cc, and leak current 976. Slicer 970 also includes comparator 674. The baseband analog signal, ENV_IN, is provided directly to a non-inverting input of comparator 774. Slicer threshold for slicer 970 is referenced to a peak of an attenuated portion of the envelope input, ENV_IN. Leak current 976 provides low droop rate to track signal fading. By relating the threshold signal to an attenuated portion of ENV_IN, false readings by comparator 674 are significantly avoided. There are substantially no restrictions on the average duty cycle of data encoding for this type of slicer.

As described previously, an amplitude of the RF input signal, and along with that the analog baseband signal amplitude may vary widely due to variations in reader distance, reader output power, multipath interference, and the like. Digital information is typically encoded in form of instantaneous low voltage values onto a baseline signal. The drops in carrier level cause ripple effect due to reactions of individual components in RFID tag circuitry. Ripple may also be caused by data filtering in the RFID reader. A ripple following an intentional low value typically includes a low value encoded onto the carrier signal. While the ripple is smaller in amplitude compared to the intentional low signal, it may still be accepted as a bit transition by the comparator.

Furthermore, interference signals from intentional sources such as other readers in the vicinity and unintentional sources such as electronic equipment in the area may cause false bit transition detections in comparator 674. By deriving the slicer threshold from on an attenuated portion of ENV_IN, the comparator's reference level is adjusted with the variation of the input signal amplitude. Accordingly, a possibility of false bit transition detections due to ripple or interference is significantly reduced decreasing errors in analog-to-digital conversion.

An amplitude of the threshold signal is determined by a product of a gain of attenuation circuit 990 and a peak amplitude of the envelope signal, ENV_IN. Attenuation circuit 990 may be implemented as a switched capacitor circuit, as described in more detail in FIGS. 12 and 13, enabling conservation of valuable power in an RFID tag and reducing circuit area on a chip.

It will be appreciated that individual circuits in slicer 970 may be implemented in any way known by the skilled in the art, and an order of the individual circuits may be modified without departing from a scope and spirit of the invention.

Figure 10:
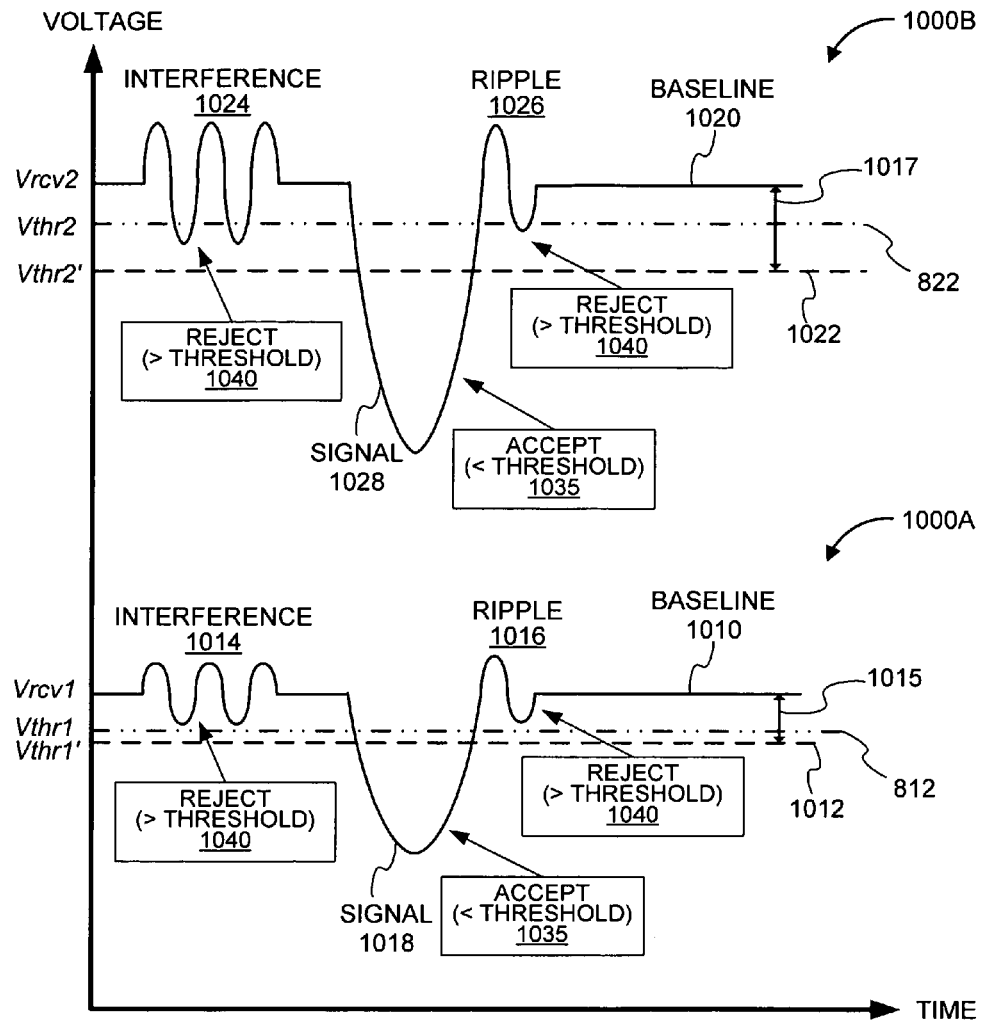
FIG. 10 is a diagram of example received waves and their acceptance or rejection in an adjustable threshold system according to an embodiment.

FIG. 10 is a diagram of example received waves and their acceptance or rejection in an adjustable threshold system according to an embodiment. The diagram of example received waves of FIG. 10 also includes two parts. Waveforms and wave features in FIG. 10 that are similarly numbered as waveforms and features in FIG. 8 represent similar phenomena and act in a likewise manner.

The first part of the diagram indicated by reference numeral 1000A shows the received wave comprising baseline 1010 and signal 1018. Baseline 1010 is at voltage value Vrcv1. Signal 1018 represents an example signal encoded onto baseline 1010 to specify to the tag bit transitions, and may or may not have the same amplitude in each repetition.

Baseline 1010 also includes interference 1014 and ripple 1016. Threshold 1012 at voltage value Vthr1' is shown on the diagram in comparison to threshold 812 of FIG. 8. A difference between Vrcv1 and Vthr1' is indicated by reference numeral 1015.

Similar to the first part 800A of the diagram in FIG. 8, interference 1014 and ripple 1016 are rejected by the comparator (rejections 1040) and signal 1018 is accepted (acceptance 1035).

In the second part of the diagram indicated by reference numeral 1000B, the received wave is shown with increased amplitudes for interference 1024, ripple 1026, and signal 1028 compared to the received wave in the first part.

Differently from FIG. 8, threshold 1022 is at Vthr2' which is lower than threshold 822 (Vthr2) because it is proportional to the detected envelope signal. A difference between threshold 1022 and baseline 1020 is indicated by reference numeral 1017. As shown in the diagram, interference 1024 and ripple 1026 do not result in false acceptances. In contrast, both features are rejected (1040) by the comparator. Signal 1028 is correctly accepted (1035).

In some embodiments, the threshold signal may be derived by a switched capacitor attenuator circuit. In other embodiments, the switched capacitor attenuator circuit may include multiple stages distributing the capacitance of a sampling capacitor such that a glitch current is reduced.

It will be appreciated that by employing a switched capacitor attenuator to derive the threshold signal, power consumption and component surface area parameters of the RFID tag are improved.

Figure 11A:
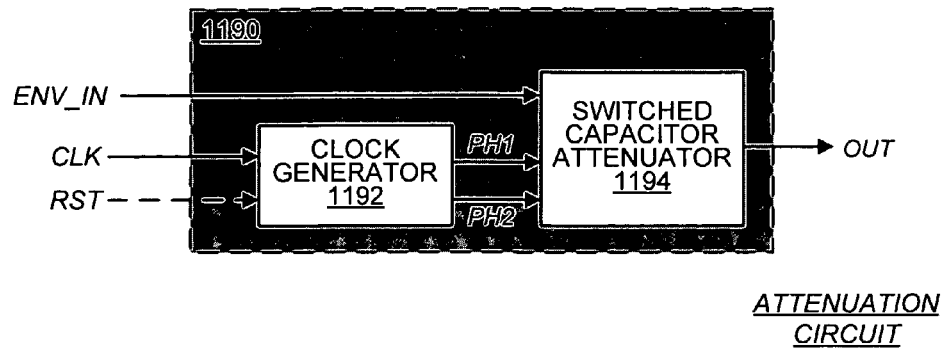
FIG. 11A is a diagram of an attenuation circuit such as the attenuation circuit of the slicer of FIG. 9.

FIG. 11A is a diagram of an attenuation circuit such as the attenuation circuit of the slicer of FIG. 9. Attenuation circuit 1190 includes clock generator 1192 and switched capacitor attenuator 1194. While any attenuator circuit known in the art may be used to derive the threshold signal from a portion of the envelope signal, a switched capacitor attenuator circuit has the advantage of conserving power, which is a valuable resource in an RFID tag energized by the received wave energy. A further advantage of switched capacitor attenuator circuits in RFID tags is their reduced size due to smaller capacitor sizes compared to large resistors that would be necessary to obtain equivalent low power consumption.

A switched capacitor attenuator circuit is generally a combination of two or more capacitors that provide an attenuated version of the input signal by charging and discharging one or more of the capacitors at different periods. Switched capacitor attenuators may be provided two non-overlapping clock signals to arrange a timing of charge and discharge cycles of the capacitor(s).

In the example attenuation circuit 1190, clock generator 1192 is employed to generate two non-overlapping timing signals, PH1 and PH2, from a single clock signal, CLK. PH1 and PH1 are then provided to switched capacitor attenuator 1194, which attenuates ENV_IN based on the timing signals and provides output signal OUT.

An optional reset signal, RST, may also be provided to the clock generator 1192 or switched capacitor attenuator 1194 for resetting the timing signals, discharging the capacitor(s) to an initial charge level, and the like.

While attenuation circuit 1190 is shown with clock generator 1192, it should be noted that other embodiments may be implemented with the timing signals being provided to switched capacitor attenuator 1194 from an external source within or outside the RFID tag. Furthermore, clock generator 1192 and switched capacitor attenuator 1194 may also be implemented together as an integrated circuit.

Figure 11B:
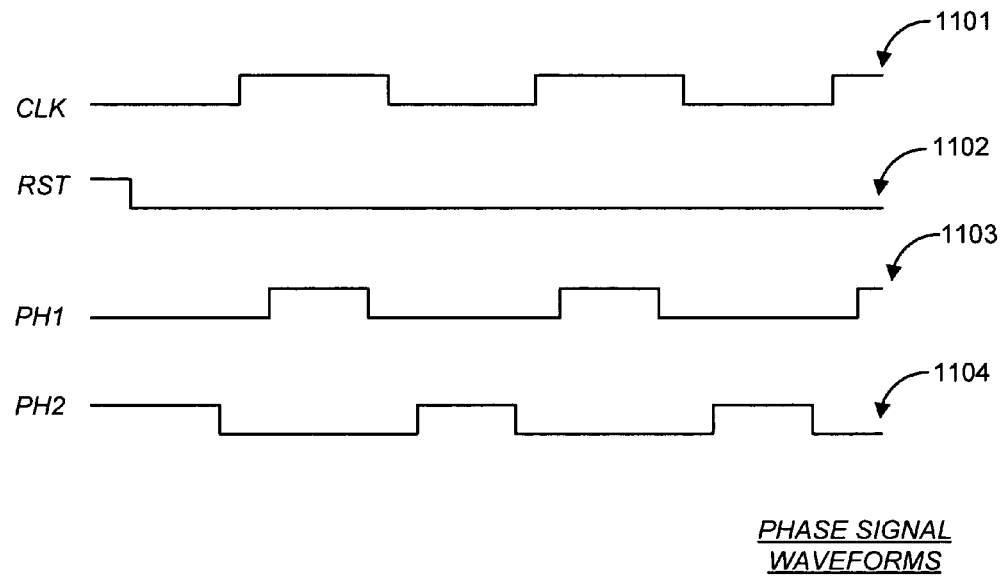
FIG. 11B illustrates example waveforms of signals associated with the attenuation circuit of FIG. 11A.

FIG. 11B illustrates example waveforms of signals associated with the attenuation circuit of FIG. 11A. Diagrams 1101 through 1104 of FIG. 11B illustrate example non-overlapping timing signals PH1 and PH2 (1103, 1104 respectively), as well as a corresponding clock signal CLK (1101). An optional reset signal RST (1102) is also included in the diagrams.

Example embodiments of the switched capacitor attenuator of the attenuation circuit of FIG. 11A are now described in more detail.

Figure 12:
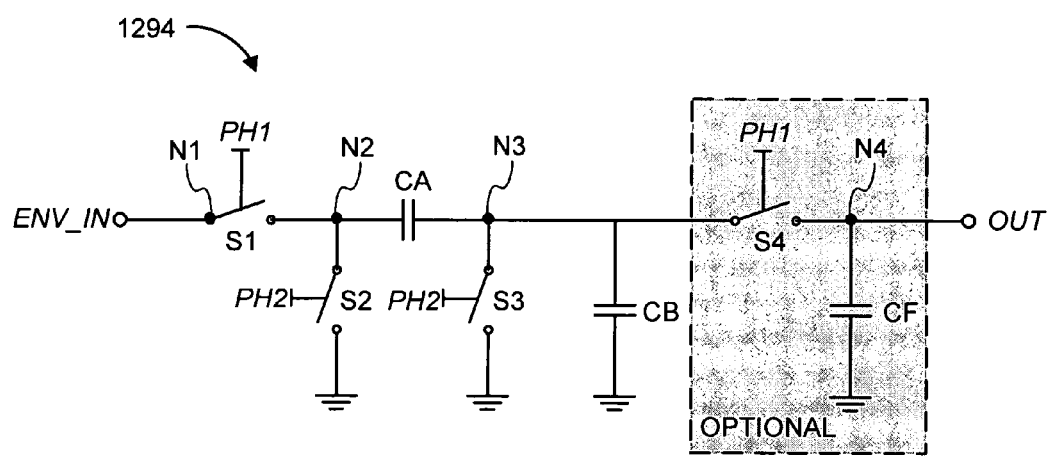
FIG. 12 is a schematic diagram of one embodiment of a switched capacitor attenuator that can be used in the attenuation circuit of FIG. 11A.

FIG. 12 is a schematic diagram of one embodiment switched capacitor attenuator 1294 that can be used in the attenuation circuit of FIG. 11A. Switched capacitor attenuator 1294 includes switch S1 that is arranged to receive ENV_IN and provide to sampling capacitor CA. Switch S1, between nodes N1 and N2, is actuated in response to timing signal PH1. Switch S2 is coupled to switch S1 and sampling capacitor CA at node N2. Actuated by timing signal PH2, switch S2 is arranged to discharge capacitor CA to a ground.

Sampling capacitor CA is coupled to switch S3 and holding capacitor CB at node N3. Holding capacitor CB is configured to receive the sampled charges from capacitor CA and forward to an output. Switch S3 is also actuated by timing signal PH2 to discharge holding capacitor CB.

Switched capacitor attenuator 1294 may further include an optional output switch S4 between node N3 and output node N4, and capacitor CF between node N4 and a ground. Optional switch S4 and capacitor C4 provide a track-and-hold function for the attenuator output, and a low-pass filter function.

In a representative operation, voltages across capacitors CA and CB are about zero Volts when PH1 is at a low value and PH2 is at a high value (i.e. switch S1 is open and switches S2 and S3 are closed). When PH1 transitions to a high value and PH2 to a low value, the voltage across capacitor CB (output voltage) may be expressed as:

$V(CB)=V(IN)*C(CA)/(C(CA)+C(CB))$, where C(CA) and C(CB) are respective capacitances of capacitors CA and CB.

If optional switch S4 and capacitor CF are included, the track-and-hold function may maintain the attenuator output voltage stored on capacitor CF at the voltage given by the above equation when PH1 subsequently transitions to a low value and PH2 to a high value. If optional switch S4 and capacitor CF are not included, the attenuator output voltage may be reduced to zero when PH1 subsequently transitions to a low value and PH2 to a high value with switch S3 connecting node N3 to ground. In the latter situation, because the attenuator output periodically returns to ground when PH2 is high, it may be necessary for the slicer to use a clocked or gated comparator that makes decisions in response to a timing signal, or alternatively to gate or to clock the slicer digital output in response to a timing signal.

If optional switch S4 and capacitor CF are included, a bandwidth of the circuit may be expressed as:

$BW=(C(CA)+C(CB))*Fclk/(2*\pi*C(CF))$, where Fclk is a clock frequency of timing signals PH1 and PH2 and C(CF) is a capacitance of the optional low pass filtering capacitor CF.

Capacitors CA, CB, and CF may be implemented as metal capacitors, Metal Oxide Semiconductor (MOS) capacitors, and the like. Switches may be implemented as CMOS transmission gates, NMOS, bootstrapped NMOS, and the like.

Capacitances C(CA) and C(CB) can be selected to adjust an attenuator gain and thus a slicer threshold. Generally, C(CA) and C(CB) may be small due to the clock frequency being high resulting in smaller circuit area.

Figure 13:
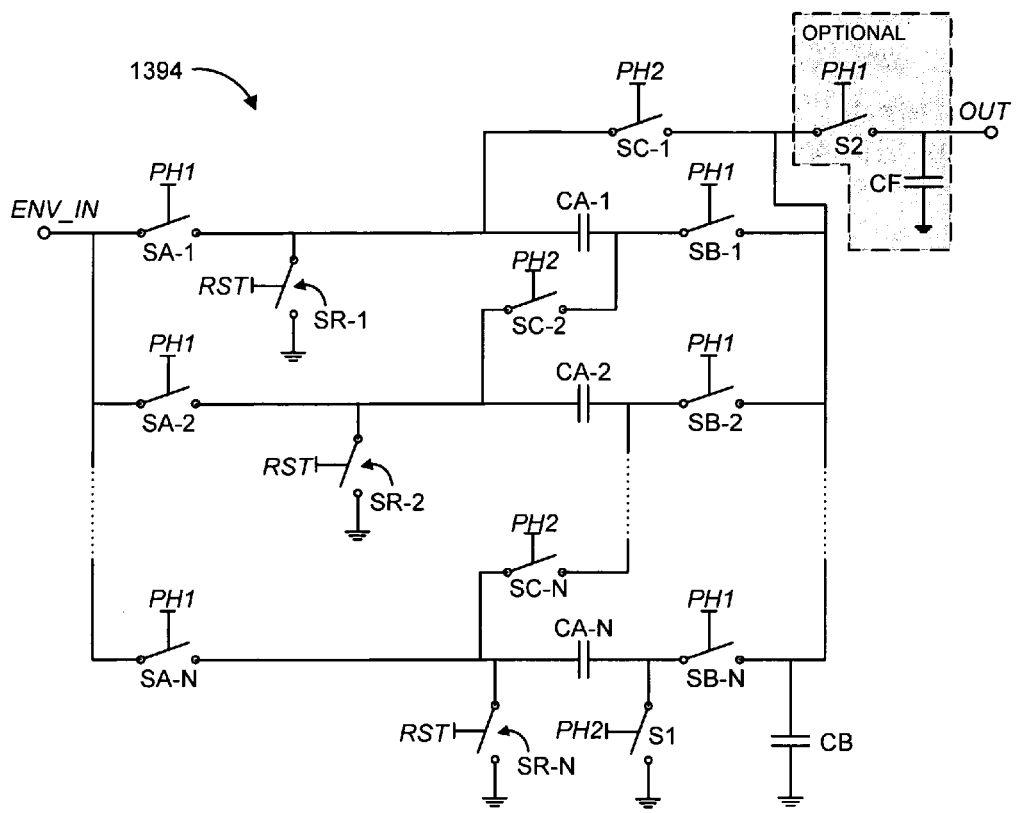
FIG. 13 is a schematic diagram of another embodiment of a switched capacitor attenuator that can be used in the attenuation circuit of FIG. 11A for low glitch applications.

FIG. 13 is a schematic diagram of another embodiment of switched capacitor attenuator 1394 that can be used in the attenuation circuit of FIG. 11A for low glitch applications.

In switched capacitor attenuator 1294, an input current glitch may occur at a rising edge of timing signal PH1. Switched capacitor attenuator 1394 is configured to minimize potential current glitches by implementing a distributed capacitance for sampling capacitor CA (e.g. CA-1 through CA-N). In one embodiment, capacitors CA-1 through CA-N and CB may be selected such that their capacitance is about the same. Of course, other embodiments may be implemented with different capacitance values for the individual capacitors. The expressions below are based on the capacitances being the same for simplicity purposes.

In one mode of operation, when PH1 is at low value and PH2 is at high value, the voltage across CB may be expressed as:

$V(CB)=V(CA\text{-}1)+V(CA\text{-}2)+\ldots+V(CA\text{-}N)$.

In this mode, any charge lost to switch leakage is redistributed and capacitor charge from last sample phase is preserved (not grounded as in FIG. 12).

When PH1 transitions to high value and PH2 transitions to low value, the voltage can be expressed as:

$V(CB)=ENV\_IN*N/(N+1)$, where N is a number of total sampling capacitors. A bandwidth of switched capacitor attenuator 1394 may be expressed as:

$BW=(N+1)*Cx*Fclk/(2*\pi*C(CF))$, where Cx is a capacitance of the equally sized capacitors (e.g. CA-1, CB, ... ). Input current glitches may still occur at PH1 rising edge but are minimized because charges from the previous sample are preserved.

As in switched capacitor attenuator, capacitors CA, CB, and CF may be implemented as metal capacitors, Metal Oxide Silicon (MOS) capacitors, and the like. Switches may be implemented as CMOS transmission gates, NMOS, bootstrapped NMOS, and the like. Reset signal (RST) actuating reset switches SR-1 through SR-N is an optional feature to discharge all residual charges from a previous sampling period.

It will be appreciated that the above described switched capacitor attenuator circuit can be implemented in different ways. Many choices are possible. For example, a number or a capacitance of each of the sampling capacitors CA-1 through CA-N can be selected based on a desired gain, a circuit size, a current glitch reduction, and the like.

Figure 14:
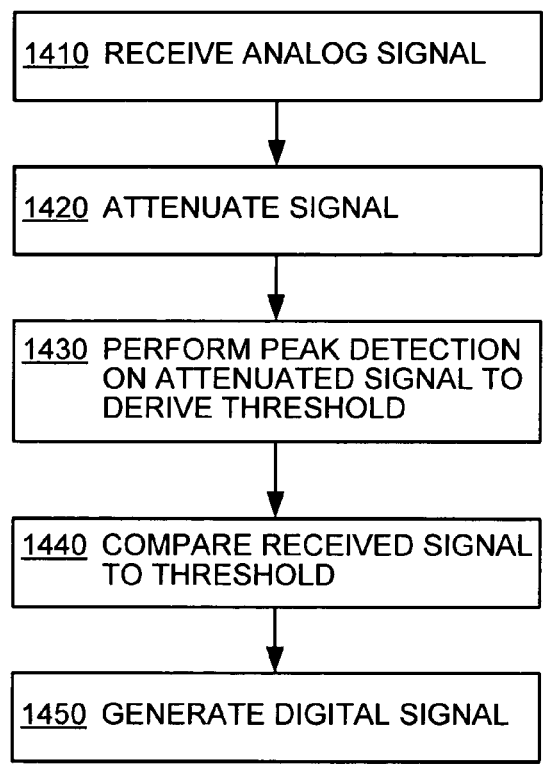
FIG. 14 is a flowchart of a process for generating a digital signal from an analog signal in an RFID tag according to embodiments.

FIG. 14 is a flowchart of a process for generating a digital signal from an analog signal in an RFID tag according to embodiments. The method of flowchart 1400 may be implemented by a demodulator of an RFID tag according to embodiments.

According to an operation 1410, an analog signal is received, such as signal ENV_IN. Signal ENV_IN in this instance has a waveform that includes a baseline, such as baseline 1020, and a signal portion, such as signal 1022 described in FIG. 10.

According to a next operation 1420, the signal is attenuated. The signal may be attenuated as described above, for example using a switched capacitor attenuator.

According to a next operation 1430, peak detection is performed on the attenuated portion of the signal to derive a threshold signal. The threshold signal may then be provided to a comparator.

According to a next operation 1440, the received signal is compared to the threshold signal. Results of the comparison may be employed to determine bit values in a digital signal. For example, any time the received signal exceeds the threshold, a high (or low) bit value may be registered.

According to a next operation 1450, a digital signal is generated from the comparison as per the above.

In the above, the order of operations is not constrained to what is shown, and different orders may be possible. In addition, actions within each operation can be modified, deleted, or new ones added without departing from the scope and spirit of the invention. Plus other, optional operations and actions can be implemented with these methods, as will be inferred from the earlier description.

In this description, numerous details have been set forth in order to provide a thorough understanding. In other instances, well-known features have not been described in detail in order to not obscure unnecessarily the description.

A person skilled in the art will be able to practice the present invention in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A demodulator circuit for an RFID tag, comprising:
    an envelope detector for deriving a first signal responsive to detecting an envelope of a received signal;
    an attenuator for attenuating a portion of the first signal to derive a second signal by repetitively charging a capacitor of the attenuator with the first signal, and then discharging the capacitor;
    a peak detector for deriving a threshold signal by detecting a peak of the second signal, wherein the threshold signal is proportional to the first signal; and
    a comparator for providing a digital signal in response to comparing the first signal and the threshold signal.

2. The demodulator circuit of claim 1, wherein
    the attenuator is a switched capacitor attenuator configured to derive the second signal by repetitively charging a capacitor with the first signal, and then discharging the capacitor.

3. The demodulator circuit of claim 2, wherein
    the capacitor is discharged completely.

4. The demodulator circuit of claim 2, wherein
    the switched capacitor attenuator includes a second capacitor, and discharging redistributes charge to the second capacitor.

5. The demodulator circuit of claim 2, wherein
    the switched capacitor attenuator further includes a reset switch configured to discharge the capacitor in response to a reset signal.

6. The demodulator circuit of claim 2, wherein
    the capacitor is adapted to be charged and discharged responsive to a clock signal.

7. The demodulator circuit of claim 6, wherein
    charging and discharging are performed in response to a first trigger signal and a second trigger signal that are derived from the clock signal such that a high value of the first trigger signal and a high value of the second trigger signal do not overlap.

8. The demodulator circuit of claim 7, wherein
    the switched capacitor attenuator includes:
    a first switch coupled between a first node and a second node such that the first signal is received at the first node, and the first switch is actuated by the first trigger signal corresponding to a sampling phase;
    a second switch coupled between the second node and a low supply voltage, and actuated by the second trigger signal corresponding to a holding phase;
    a sampling capacitor coupled between the second node and a third node;
    a third switch coupled between the third node and the low supply voltage, and actuated by the second trigger signal such that the second switch and the third switch are arranged to shunt the sampling capacitor in response to the second trigger signal; and
    a holding capacitor coupled between the third node and the low supply voltage.

9. The demodulator circuit of claim 8, further comprising:
    a fourth switch coupled between the third node and a fourth node such that the threshold signal is provided at the fourth node, and the fourth switch is actuated by the first trigger signal;
    a filtering capacitor coupled between the fourth node and the low supply voltage such that the third capacitor acts as a low-pass filter.

10. The demodulator circuit of claim 8, wherein
    a capacitance of the sampling capacitor and a capacitance of the holding capacitor define a gain of the switched capacitor attenuator, and
    a peak of the threshold signal is determined from the gain.

11. The demodulator circuit of claim 2, wherein
    the switched capacitor attenuator is configured to:
    charge a first sampling capacitor and a second sampling capacitor by actuating a first sampling switch and a second sampling switch;
    transfer the charges in the first sampling capacitor and the second sampling capacitor to a holding capacitor by actuating a first holding switch and a second holding switch; and
    discharge the first sampling capacitor and the second sampling capacitor by actuating a first discharging switch and a second discharging switch.

12. The demodulator circuit of claim 11, wherein
    the switched capacitor attenuator is further configured to:
    filter the attenuated portion of the first signal employing a filter switch and a filter capacitor acting as a low-pass filter.

13. The demodulator circuit of claim 11, wherein
    the first sampling switch, the second sampling switch, the first holding switch, the second holding switch, and the filter switch are actuated by a first trigger signal; and
    the first discharging switch and the second discharging switch are actuated by a second trigger signal.

14. The demodulator circuit of claim 13, wherein
    the switched capacitor attenuator is further configured to:
    charge a third sampling capacitor by actuating a third sampling switch;
    transfer the charges in the third sampling capacitor to the holding capacitor by actuating a third holding switch; and
    discharge the third sampling capacitor by actuating a third discharging switch; and wherein the third sampling switch and the third holding switch are actuated by the first trigger signal, and the third discharge switch is actuated by the second trigger signal.

15. The demodulator circuit of claim 1, further comprising:
a leak current circuit adapted to provide a low droop rate to track a fading of the analog signal.

16. The demodulator circuit of claim 1, wherein the attenuator is a resistive attenuator.

17. A demodulator circuit for an RFID tag, comprising:
a means for deriving a first signal responsive to detecting an envelope of a received signal;
a means for attenuating at least a portion of the first signal to derive a second signal;
a means for deriving a threshold signal by detecting a peak of the second signal, wherein the threshold signal is proportional to the first signal; and
a means for deriving a digital signal by comparing the first signal and the threshold signal.

18. The RFID tag of claim 17, wherein
the means for attenuating at least a portion of the first signal is configured to derive the second signal by repetitively charging a capacitive circuit with the first signal, and then discharging the capacitive circuit.

19. A method for a demodulator circuit in an RFID tag, comprising:
deriving a first signal responsive to detecting an envelope of a received signal;
attenuating at least a portion of the first signal to derive a second signal;
deriving a threshold signal by detecting a peak of the second signal, wherein the threshold signal is proportional to the first signal; and
deriving a digital signal by comparing the first signal and the threshold signal.

20. The method of claim 19, wherein
attenuating at least a portion of the first signal includes repetitively charging a capacitive circuit with the first signal, and then discharging the capacitive circuit.

21. The method of claim 20, wherein
a capacitance of at least one capacitor of the capacitive circuit defines a gain of the capacitive circuit, and
a peak of the threshold signal is determined from the gain.

22. The method of claim 20, wherein
charging and discharging are performed in response to a clock signal.

23. The method of claim 22, wherein
charging and discharging are performed in response to a first trigger signal and a second trigger signal that are derived from the clock signal.

24. The method of claim 23, wherein
charging and discharging the capacitive circuit includes:
actuating a first and a fourth switch of the capacitive circuit by the first trigger signal corresponding to a sampling phase; and
actuating a second and a third switch of the capacitive circuit by the second first trigger signal correspond to a holding phase such that a high value of the first trigger signal and a high value of the second trigger signal do not overlap.

25. The method of claim 19, further comprising:
low-pass filtering the second signal.

* * * * *